US008725303B2

(12) United States Patent
Park et al.

(10) Patent No.: US 8,725,303 B2
(45) Date of Patent: May 13, 2014

(54) SYSTEM AND METHOD FOR THE MULTI-DIMENSIONAL REPRESENTATION OF ENERGY CONTROL

(75) Inventors: Daniel J. Park, Beaverton, OR (US); James E. Owen, Vancouver, WA (US); Carl Mansfield, Camas, WA (US); David Elrod, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 531 days.

(21) Appl. No.: 13/178,723

(22) Filed: Jul. 8, 2011

(65) Prior Publication Data
US 2013/0013124 A1 Jan. 10, 2013

(51) Int. Cl.
*G01R 15/00* (2006.01)
*G01R 21/00* (2006.01)
*G05B 13/02* (2006.01)
*G05D 17/00* (2006.01)
*G05D 23/00* (2006.01)
*G06F 17/00* (2006.01)
*G06G 7/54* (2006.01)
*G06Q 10/00* (2012.01)
*G06Q 30/00* (2012.01)
*G09G 5/02* (2006.01)
*G09G 5/00* (2006.01)

(52) U.S. Cl.
USPC ............. 700/286; 700/32; 700/33; 700/34; 700/295; 700/299; 345/589; 345/619; 702/57; 702/60; 702/61; 702/62; 703/18; 705/7.12; 705/26.61; 705/26.64; 705/27.2; 705/348; 705/400

(58) Field of Classification Search
USPC ........ 700/32, 33, 34, 286, 295, 299; 345/589, 345/619; 702/57, 60, 61, 62; 703/18; 705/7.12, 26.61, 26.64, 27.2, 348, 400
See application file for complete search history.

(56) References Cited

U.S. PATENT DOCUMENTS

| | | | |
|---|---|---|---|
| 5,218,526 A * | 6/1993 | Mozzo | 700/32 |
| 5,428,465 A | 6/1995 | Kanamori et al. | |
| 5,959,616 A | 9/1999 | Challener | |
| 6,290,140 B1 * | 9/2001 | Pesko et al. | 236/47 |
| 6,778,863 B1 * | 8/2004 | Lienhard et al. | 700/32 |
| 6,950,124 B2 * | 9/2005 | Corl et al. | 348/180 |
| 6,956,581 B2 | 10/2005 | Cui et al. | |

(Continued)

FOREIGN PATENT DOCUMENTS

| | | |
|---|---|---|
| JP | 2000-078748 | 3/2000 |
| WO | WO2010082536 | 7/2010 |

*Primary Examiner* — Mohammad Ali
*Assistant Examiner* — Jennifer L Norton
(74) *Attorney, Agent, or Firm* — Law Office of Gerald Maliszewski; Gerald Maliszewski

(57) ABSTRACT

A multi-dimensional energy control system is provided with an energy management software application that organizes the consumption of energy by a device as an n-dimensional energy space, where n is an integer greater than 2, and each axis in the energy space represents an energy consumption characteristic. The energy management application generates instructions for a device in response to calculating a compromise operating point in the energy space. A user interface (UI) connected to the energy management application has a display to receive a graphical representation of the energy space and compromise operating point, and an input to receive user commands for moving the represented compromise operating point in the represented energy space. The energy management application calculates the compromise operating point in the energy space to match the displayed compromise operating point.

18 Claims, 8 Drawing Sheets

(56) References Cited

U.S. PATENT DOCUMENTS

| | | | |
|---|---|---|---|
| 7,110,832 B2* | 9/2006 | Ghent | 700/16 |
| 7,917,234 B2* | 3/2011 | Tuszynski | 700/33 |
| 8,442,693 B2* | 5/2013 | Mirza et al. | 700/276 |
| 8,452,992 B2* | 5/2013 | Bosisio et al. | 713/300 |
| 2003/0028269 A1* | 2/2003 | Spriggs et al. | 700/83 |
| 2005/0144090 A1* | 6/2005 | Gadamsetty et al. | 705/26 |
| 2007/0162355 A1* | 7/2007 | Tabin | 705/27 |
| 2008/0082183 A1* | 4/2008 | Judge | 700/33 |
| 2008/0270927 A1* | 10/2008 | Chang | 715/771 |
| 2009/0216342 A1* | 8/2009 | Goodyear et al. | 700/17 |
| 2011/0106277 A1* | 5/2011 | Sayyar-Rodsari et al. | 700/30 |
| 2011/0231320 A1* | 9/2011 | Irving | 705/80 |
| 2011/0264418 A1* | 10/2011 | Szewczyk et al. | 703/2 |
| 2011/0282505 A1* | 11/2011 | Tomita et al. | 700/291 |
| 2012/0059607 A1* | 3/2012 | Rebec et al. | 702/61 |
| 2013/0073232 A1* | 3/2013 | Billingsley et al. | 702/61 |

* cited by examiner

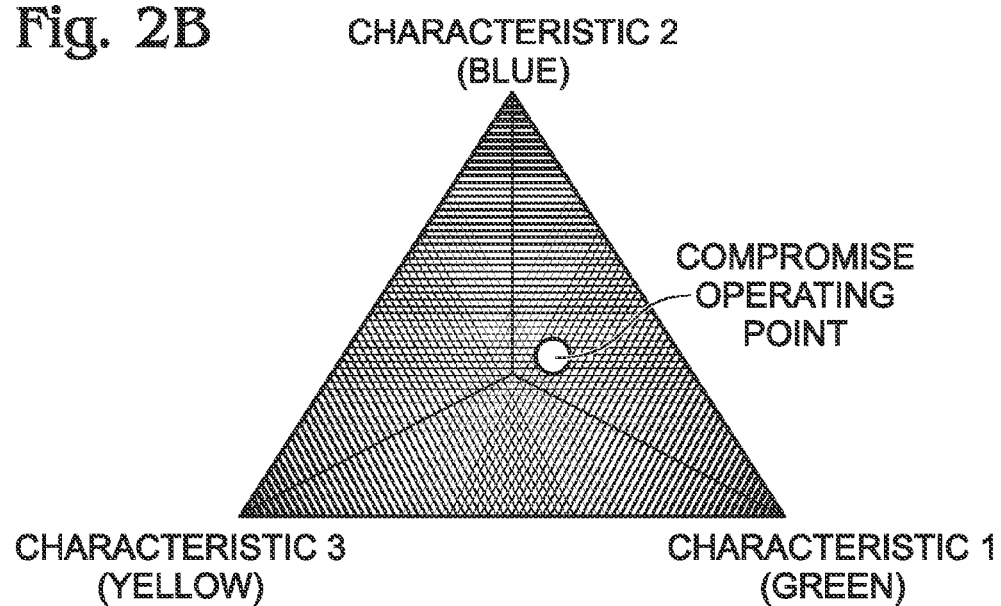
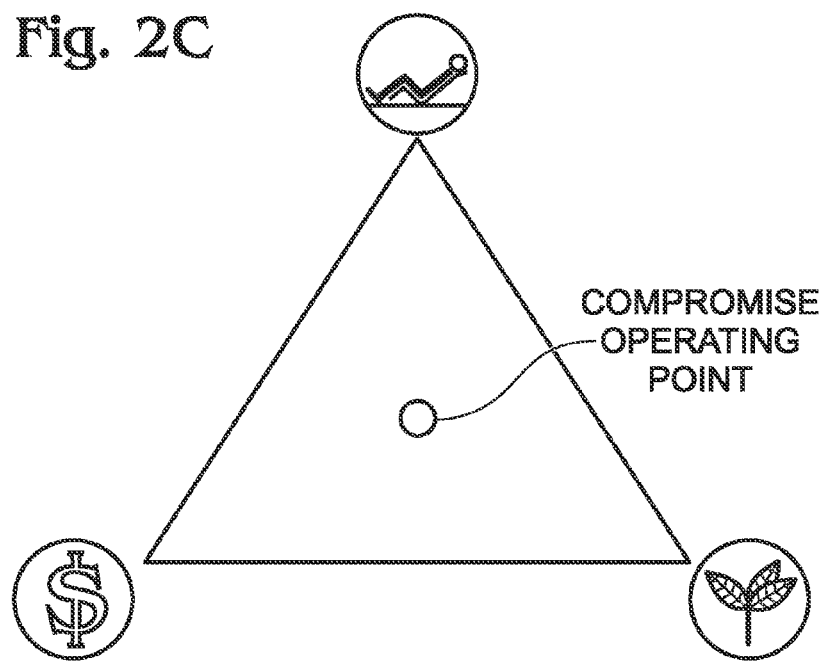

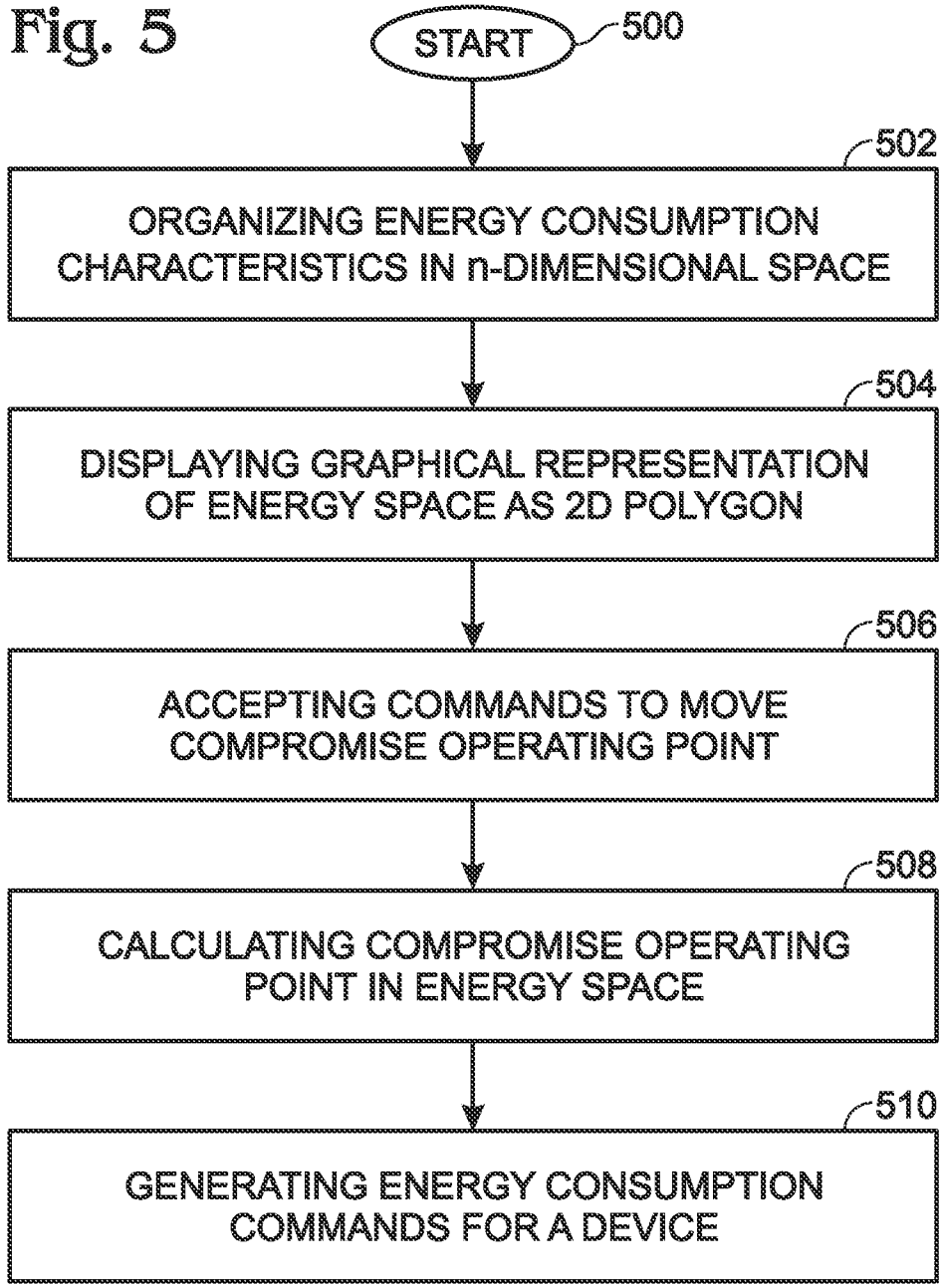

SYSTEM AND METHOD FOR THE MULTI-DIMENSIONAL REPRESENTATION OF ENERGY CONTROL

BACKGROUND OF THE INVENTION

1. Field of the Invention

This invention generally relates to energy management and, more particularly, to a system and method for representing energy consumption as interdependent multi-dimensional energy characteristics.

2. Description of the Related Art

One of the goals of a home energy management system (HEMS) is to manage energy in the most effective way to satisfy the residents' desires. One issue in attaining this goal is to determine the residents' desires. Some HEMSs assume that residents want to minimize cost of energy within preset bounds. Other systems offer a set of goals, such as cost and comfort, on which the user selects a preference. The preference level can be set as a number between a minimum and a maximum value, such as 0 to 100, or may be set as one of a set of fixed values, such as low, medium, and high.

There are control systems that optimize the system performance characteristics against a set of input weights on those characteristics. For example a climate control system may optimize the HVAC system output for temperature, or economy, or humidity, or turnover, or any number of measures of air quality. Control systems may have input settings provided by the operator to tell the system how to tradeoff competing characteristics. The tradeoff input is often supplied in the form of a number set between a minimum and maximum value (say 0 to 100) to indicate the relative weight to put on the characteristic. The weight on each of the characteristics is input to the control system by such means as a numerical input, a dial setting, or any method that can be transformed into a value between the minimum and maximum.

However, even if a user is given the option of managing their home energy use using a combination of considerations, it is often difficult for the uninformed to select appropriate operating limits for appliances. This is especially true when the user needs to pick operating limits for somewhat abstract notions such as "cost savings", "ecology mode", and "comfort mode".

For example, when the outside temperature is more than 70 degrees, a temperature up to 5 degrees over the setpoint, and 10 degrees below the setpoint may be tolerated by a user. When the outside temperature is less than 60 degrees, the user can likely tolerate up to 5 degrees over or under the setpoint. These functions are difficult to implement. Further, appliances that could delay their work and function by a given time can eliminate much of the inconvenience of timed execution.

The industry commonly uses price as a way of controlling time of use. Some utilities have Time of Day pricing (TOD), some use Dynamic pricing (which works well with automated homes that can delay usage) where the price changes every 15 minutes to match wholesale prices (with some limits). Other utilities implement emergency notices called Demand Response (DR) and they give incentives for reducing electricity usage for short periods (maybe $1.50 for reducing usage for 2 hours).

Varying prices and incentives are negative because they favor the consumers who can afford the automation, and they may surprise consumers with unexpected high bills. Because of the negative aspects of price control and incentive programs combined with the slow pace of utility negotiations with their regulators, most of the US residential customers have the same price of electricity throughout the day regardless of the instantaneous wholesale price of electricity.

Because electricity cost does not vary as much as the real instantaneous cost to produce the electricity, shifting loads to when electricity is cheapest to produce does not give the user a direct cost benefit, but in general, it would lower the price of electricity for the community as a whole. Hence, ecological-based energy management may lower the overall cost of electricity by utilizing the equipment more efficiently and postponing the building of more generation and transmission facilities. That is, greater use of the ecology mode could either minimize the cost of electricity production, or minimize the environmental damage of electricity production.

Many times, reducing the cost of electricity also reduces the environmental impact. For example, postponing building more plants and transmission lines by using what is available avoids the impact of the extra resources. However, renewable resources are much more expensive than coal plants, so electricity cost can be opposite to environmental costs. As more renewable sources become available, the ecology mode should ensure that these sources are fully utilized. When renewables become dominant, then the ecology mode should constantly shift usage to match renewable energy availability.

It would be advantageous if a home energy user could be given a visually intuitive control method that permitted control over a plurality of interdependent energy considerations. It would be advantageous if a multi-dimensional energy space of energy characteristics could be represented as two-dimensional polygonal figure on a graphic display.

SUMMARY OF THE INVENTION

Disclosed herein is a home energy management system (HEMS) graphical user interface (GUI) that presents a polygon, such as an equilateral triangle, on its display to represent the configuration of operational characteristics of the HEMS. Each vertex of the triangle is labeled with a characteristic of the HEMS operation that is optimized against the other vertices of the triangle (e.g. financial thrift, ecological conservation, and user comfort). In one aspect, a marker within the boundary of the triangle indicates the present tradeoffs being made by the HEMS amongst the operational characteristics. The closer the marker is to any vertex, the stronger the operation of the HEMS is biased towards that characteristic.

The user may relocate the marker within the triangle to change the operational characteristics of the HEMS algorithms. If the user moves the marker to a vertex, then the algorithms optimize for the corresponding characteristic. If the marker is relocated into the interior of the triangle, the algorithms make a compromise between the characteristics. A weight is given to characteristics based on the relative distance of their vertex to the marker and the set of resulting weights are provided as input to the algorithms which optimize operation of the system to those inputs.

When the user selects an operating point by placing a marker in the interior of the triangle, the user is shown the expected compliance of the system against the characteristics. The visualization is given as, for example, a color and/or a set of performance numbers as computed by the algorithms for this point. The color displayed may be the sum of the intensity of colors assigned to each characteristic, where the intensity of each color is related to the affinity (or "goodness") of this point to the characteristic. The interior of the triangle may be a gradient of colors where each point inside the triangle is colored by the computed affinity of the point to the characteristics.

Accordingly, a multi-dimensional energy control system is provided. An energy management software application organizes the consumption of energy by a device as an n-dimensional energy space, where n is an integer greater than 2, and each axis in the energy space represents an energy consumption characteristic. The energy management application generates instructions for a device in response to calculating a compromise operating point in the energy space. A user interface (UI) connected to the energy management application has a display to receive a graphical representation of the energy space and compromise operating point, and an input to receive user commands for moving the represented compromise operating point in the represented energy space. The energy management application calculates the compromise operating point in the energy space to match the displayed compromise operating point.

For example, the UI display may present the energy space as a two-dimensional polygon with n vertices, where each vertex is associated with a corresponding energy consumption characteristic. If the energy management application organizes the consumption of energy by the device as a three-dimensional energy space, the UI display represents the energy space as a triangle. In one aspect, the UI display presents each triangle vertex as being associated with a color, and in another aspect the compromise operating point is represented as a blend of the triangle vertices colors.

Additional details of the above described system, a multi-dimensional energy control GUI, and a method for controlling a multi-dimensional energy control system, are provided below.

BRIEF DESCRIPTION OF THE DRAWINGS

FIG. 2A is a diagram depicting an energy space, while FIGS. 2B through 2I are corresponding versions of a GUI representation of the energy space.

FIG. 5 is a flowchart illustrating a method for controlling a multi-dimensional energy control system.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with monitoring a controlling and displaying energy consumption characteristics. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 1:
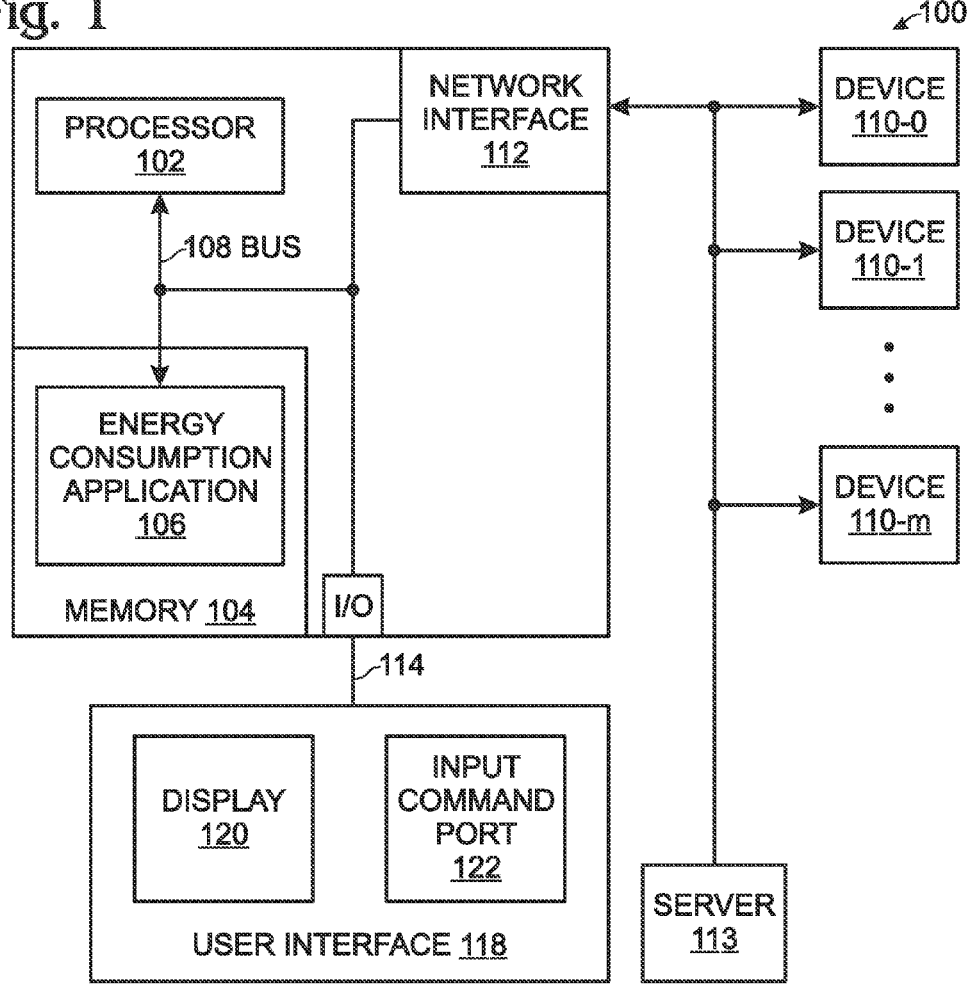
FIG. 1 is a schematic block diagram of a multi-dimensional energy control system.

FIG. 1 is a schematic block diagram of a multi-dimensional energy control system. The system 100 comprises a processor 102, a memory 104, and an energy management application 106. The energy management application is enabled as a sequence of software instructions stored in the memory 104, or other computer-readable medium, and executed by the processor 102. The system 100 may be enabled as a personal computer (PC), Mac computer, tablet, workstation, server, PDA, handheld device, or single-function device. The processor or central processing unit (CPU) 102 may be connected to memory 104 via an interconnect bus 108. The memory 104 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 102.

The memory 104 may also comprise a mass storage with one or more magnetic disk or tape drives or optical disk drives, for storing data and instructions for use by processor 102. For a workstation PC, for example, at least one mass storage system in the form of a disk drive or tape drive, stores the operating system and application software. The mass storage may also include one or more drives for various portable media, such as a floppy disk, a compact disc read only memory (CD-ROM), or an integrated circuit non-volatile memory adapter (i.e. PC-MCIA adapter) to input and output data and code.

The energy management application 106 organizes the consumption of energy by a device as an n-dimensional energy space, where n is an integer greater than 2. Each axis in the energy space represents an energy consumption characteristic. The energy management application 106 generates instructions for a device 110 in response to calculating a compromise operating point in the energy space. The system 100 may have a network interface 112, which may be a modem, an Ethernet card, or any other appropriate data communications device such as USB to communicate with device 110. The physical communication links may be optical, wired, or wireless. The network interface may also be connected to a network server 113 to receive information concerning energy costs and environmental conditions.

The system 100 may further include appropriate input/output (IO) ports on line 114 for a user interface (UI) 118, with a display 120 and a user input command port 122 such as a keyboard or touchscreen. For example, the system 100 may include a graphics subsystem or WEB server to drive the output display. The output display 120 may a liquid crystal display (LCD). The input control devices for such an implementation may include the keyboard for inputting alphanumeric and other key information. The input control devices on line 114 may further include a cursor control device (not shown), such as a mouse, touchpad, touchscreen, trackball, stylus, or cursor direction keys. The links to the peripherals on line 114 may be wired connections or use wireless communications.

The UI 118 is connected to the energy management application 106 and the display 120 receives a graphical representation of the energy space and compromise operating point. The input 122 receives user commands for moving the represented compromise operating point in the represented energy space. Then, the energy management application 106 calculates the compromise operating point in the energy space to match the displayed compromise operating point.

In one aspect, the energy management application organizes the consumption of energy for a plurality of devices (110-0 through 110-*m*) in a corresponding plurality of n-dimensional energy spaces (e.g., n=3), and the UI display represents each energy space with a corresponding triangle. Some examples of devices include furnaces, air conditioners, and lighting, to name a few examples.

Figure 2A:
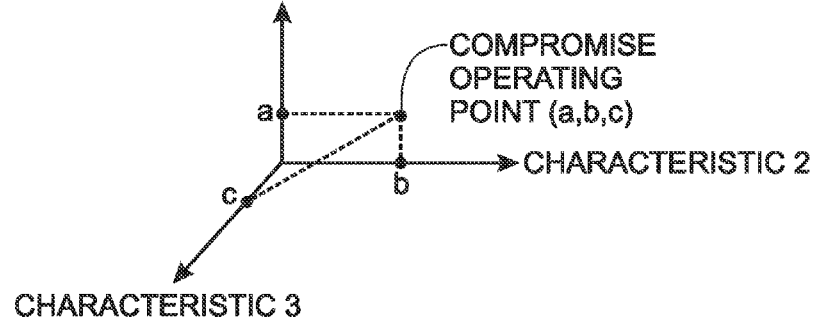

FIG. 2A is a diagram depicting an energy space, while FIGS. 2B through 2I are corresponding versions of a GUI representation of the energy space. Generally, the UI display presents the energy space as a two-dimensional polygon with n vertices, where each vertex is associated with a corresponding energy consumption characteristic. Alternately stated, an energy management GUI application presents device energy consumption on the display as a two-dimensional polygon representing an energy space of n interdependent energy characteristics, where n is an integer value greater than 2, and where each energy characteristic is associated with a corresponding vertex of the polygon.

For example, the energy management application may organize the consumption of energy by the device as a three-dimensional energy space, and the UI display represents the energy space as a triangle. In one aspect (FIG. 2B), the UI display presents each triangle vertex as being associated with a color. If the relationship between energy consumption characteristics is linear, the triangle may be an equilateral triangle. If the relationships are non-linear, the triangle may still be equilateral, but movement inside the triangle would be non-linear.

In another aspect not shown, lines similar isobaric or map elevation lines can be added to the triangle to add additional information. For example, an arc around an ecology vertex may indicate to the user that if the compromise operating point is moved inside the arc (adjacent the ecology vertex), the user will be spending than they would if setting the operating point to 100% comfort. In another aspect, grayscale shading or patterns can be associated with each vertex, to replace the use of color.

Figure 2D:
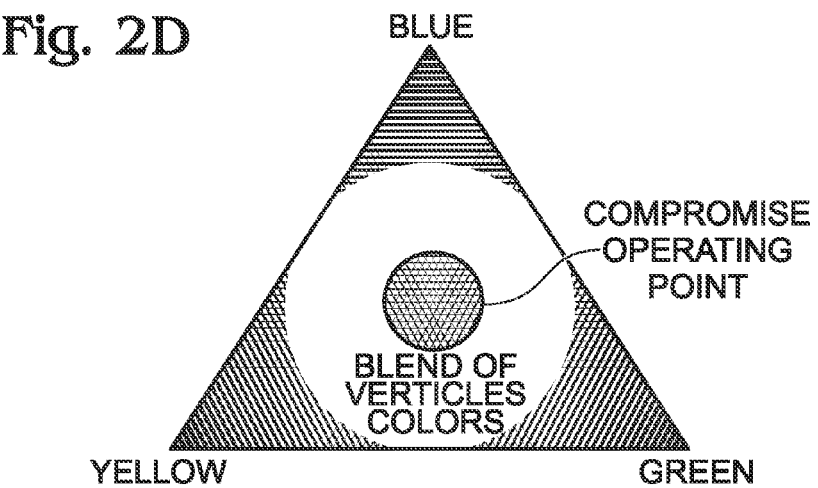

In FIG. 2C the three energy consumption characteristics are presented as comfort (reclining figure), user economy or savings (dollar sign), and ecology (twig of leaves). Other energy consumption characteristics (not shown) may include community needs or device lifetime (device maintenance). In FIG. 2D the compromise operating point is represented as a blend of the triangle vertices colors. The color gradient inside the compromise operating point circle is an intuitive indicator of how close the operating point is to a vertex color (energy consumption characteristic).

Figure 2E:
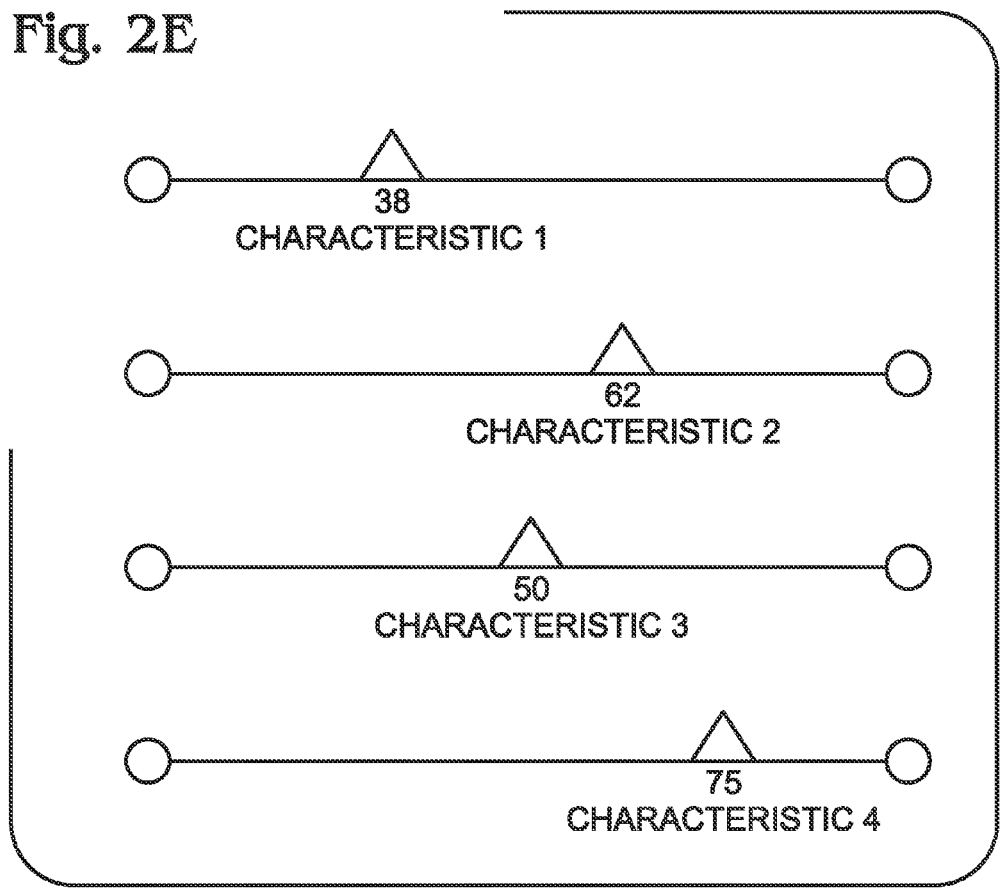

In FIG. 2E the UI display represents the energy space as n selectively variable, but interdependent indicators, where a change in one indicator causes a change in a second indicator. Here the indicators are shown as sliders, but alternatively they may be raw numbers (e.g., 0 to 100) or a dial. If the energy consumption characteristics are interdependent, a change in the position of slider one is likely to cause movement in the other sliders. Note: in this example there are 4 energy consumption characteristics.

Figure 2F:
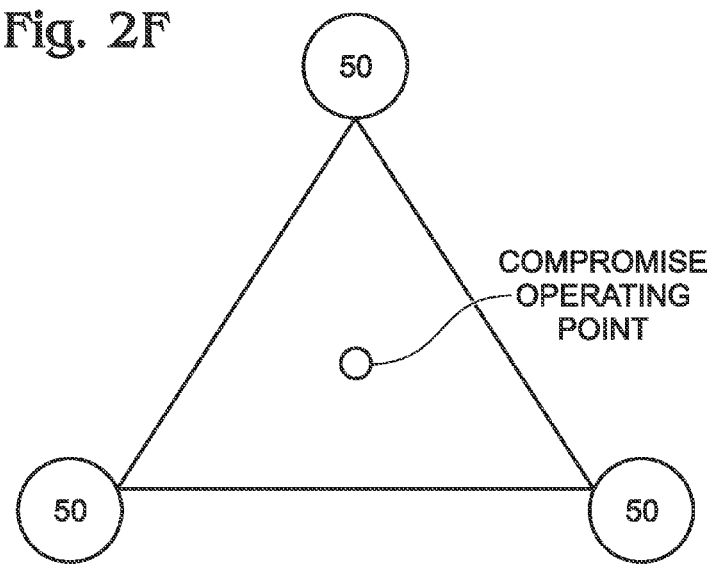
Figure 2G:
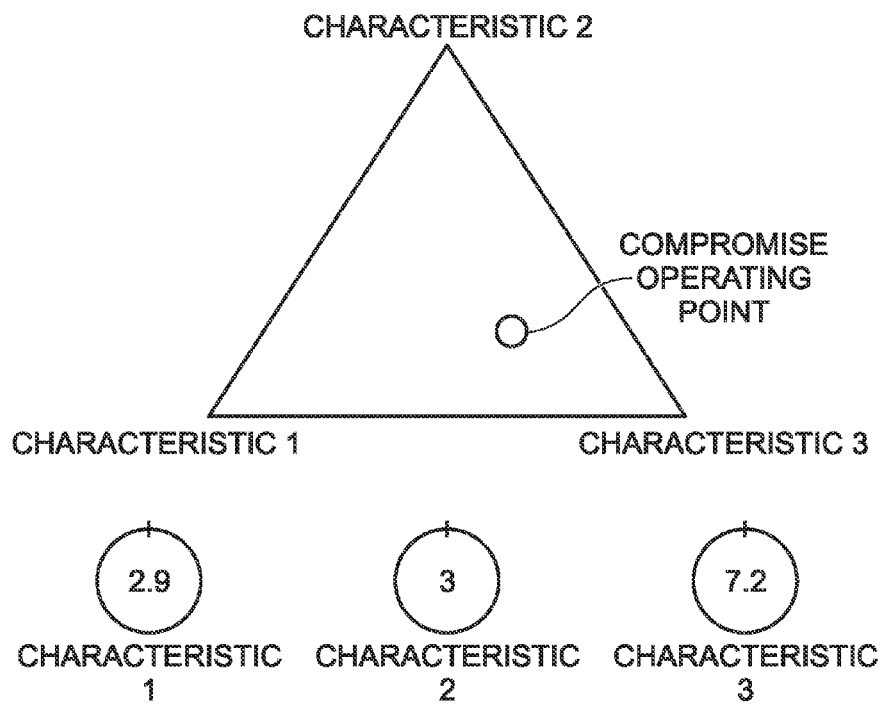
Figure 2H:
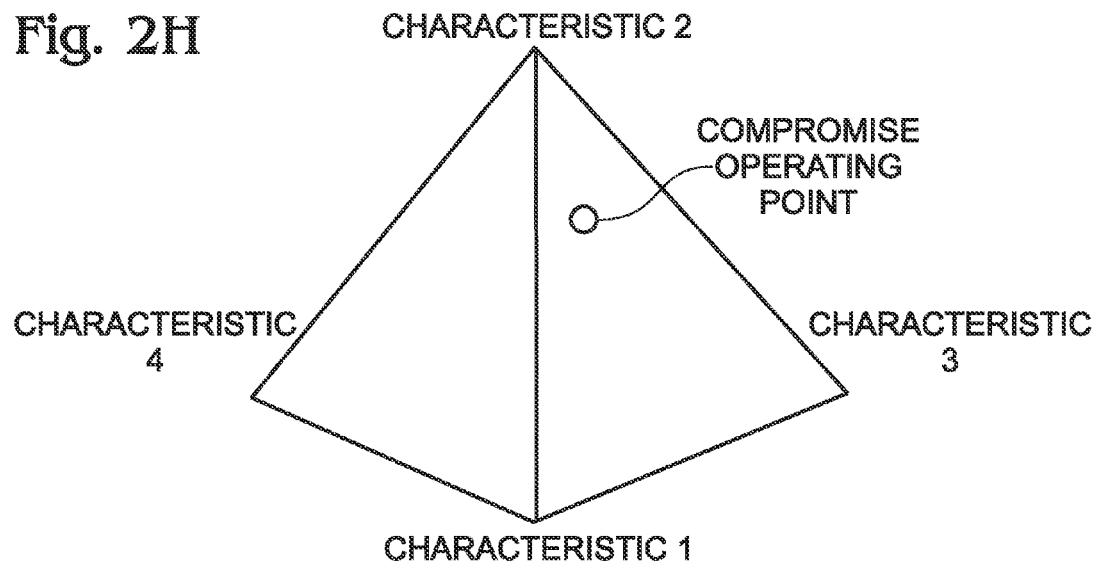

In another aspect, the UI display represents the energy space as a two-dimensional polygon with n vertices (in this example n=3), where each vertex is associated with a corresponding energy consumption characteristic, as above. Additionally, the UI display represents each vertex as a selectively variable, but interdependent indicator. In FIG. 2F there is a raw number at each vertex indicating the value of the compromise operating point with respect to the energy consumption characteristic represented by the vertex. In FIG. 2G, the operating point is represented using a polygon and a set of dials, where each dial setting represents the energy consumption characteristic represented by a corresponding polygon vertex. Alternatively, additional marks can be added to the lines between vertices to help indicate scale.

In one aspect (FIG. 2H), the UI display presents the energy space as a three-dimensional polygon with n vertices (in this example n=4), where each vertex is associated with a corresponding energy consumption characteristic. On a two-dimensional display, the polygon may be depicted in perspective. A three-dimensional display is able to represent a polygon in 3D space.

Figure 2I:
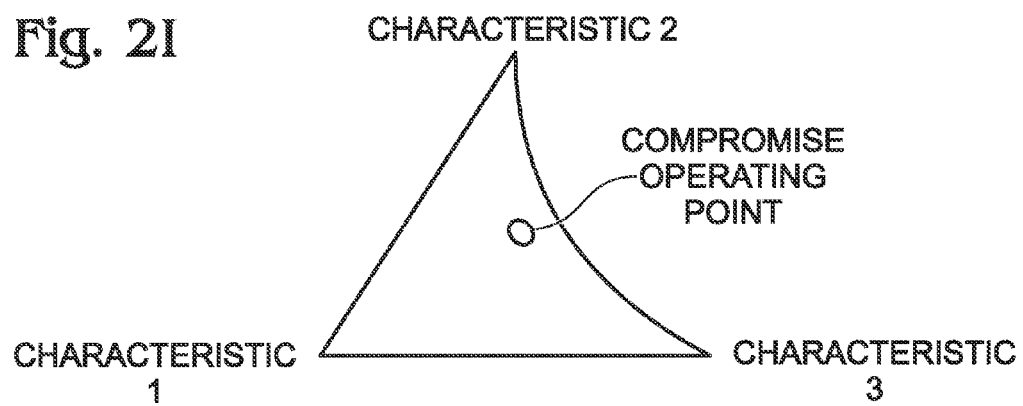

The relationship between energy consumption characteristics need not necessarily be linear, as might be represented by an equilateral triangle. In some aspects, non-linear relationships between energy consumption characteristics can be represented by modifying the length of the sides connecting vertices (e.g., an obtuse triangle). In other aspects, the UI display may present a polygon in a perspective view with at least one representation of a curved line connecting two vertices as shown in FIG. 2I.

Figure 3A:
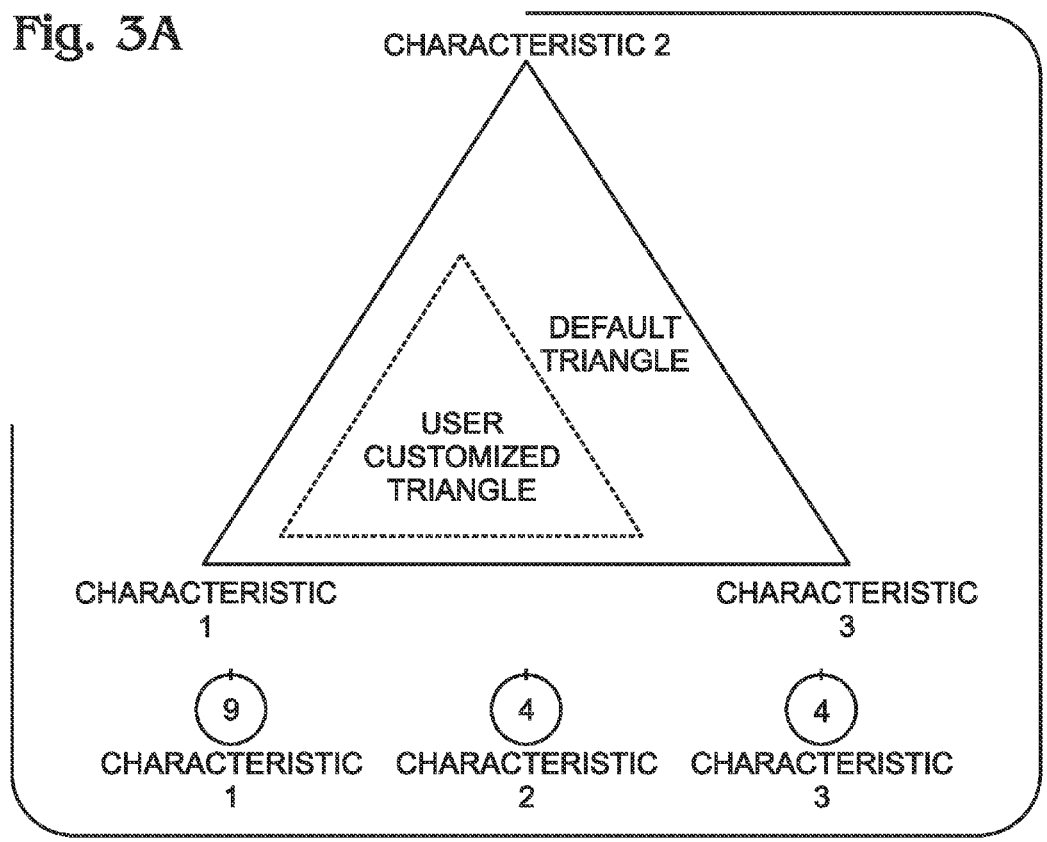
FIGS. 3A and 3B are figures depicting a process for the user to modify energy consumption default settings.
Figure 3B:
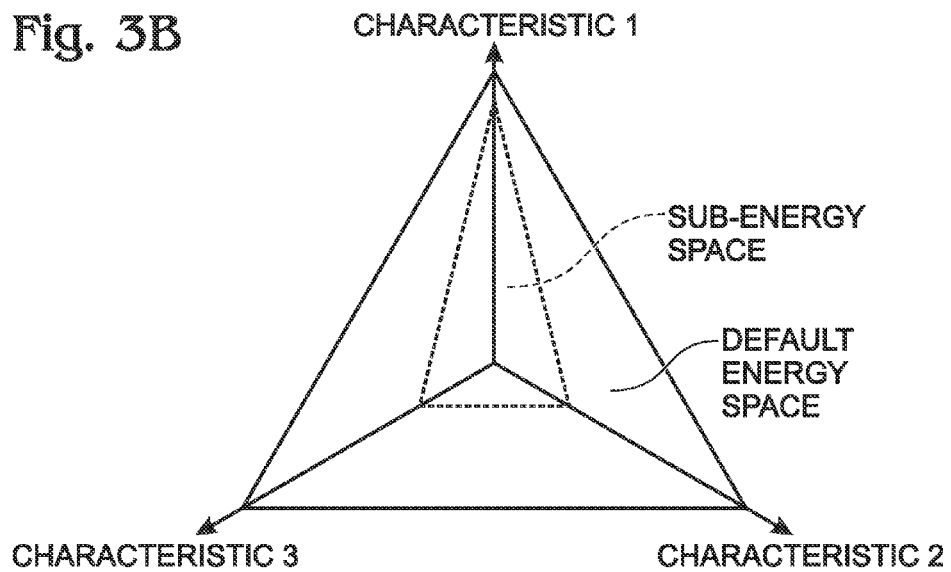

FIGS. 3A and 3B are figures depicting a process for the user to modify energy consumption default settings. In FIG. 3A the UI display presents a default equilateral triangle with initial condition settings for each vertex. The UI further presents a set of menu-driven prompts to accept user commands for modifying the initial condition settings. Menu-driven GUIs with different paths enabled by user responses are well known in the art. The user may redefine the values associated with energy consumption characteristic. For example, for an environmental control device, the user may change the default "comfort" energy consumption characteristic from 72 degrees±1 degree, to 72 degrees±5 degrees. Here a set of dials is shown, but alternately a touchscreen may be used to move the vertices positions. The energy management application modifies the weighting of energy characteristics of a default initial condition energy space (FIG. 3B), creating a sub-energy space (inside phantom lines), and inside the default initial condition energy space. In one aspect, the default initial condition energy space is the maximum range of settings for each energy consumption characteristic. Then, the UI display, in response to sub-energy space, represents a user-customized triangle (in phantom) with each vertex located inside the default equilateral triangle.

Figure 4A:
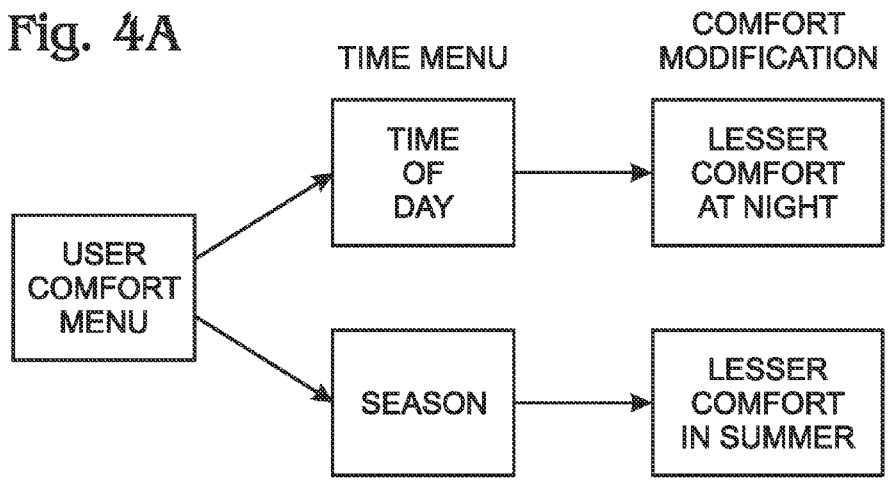
FIGS. 4A through 4C are diagrams depicting a UI for modifying energy consumption characteristics.
Figure 4B:
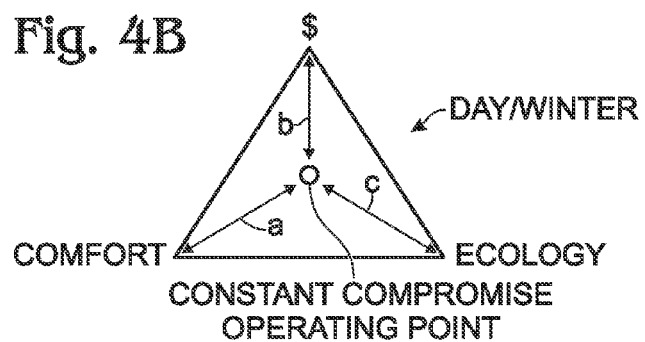
Figure 4C:
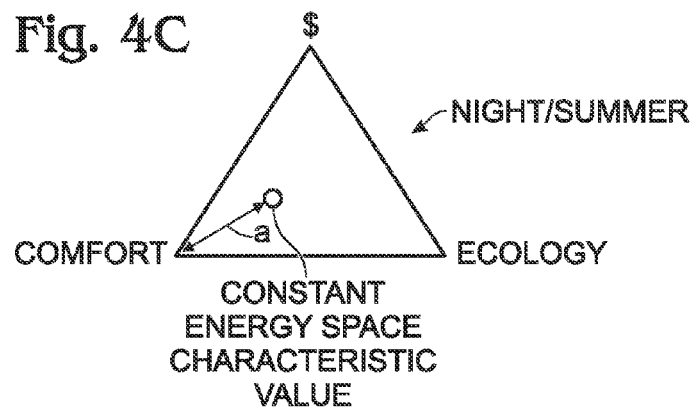

FIGS. 4A through 4C are diagrams depicting a UI for modifying energy consumption characteristics. The energy management application (FIG. 4A) accepts inputs such as time: time of day or season. Another input may be time varying user preferences, e.g., the user is willing to accept a lesser level of comfort in the night or during the summer. Another input affecting weighting may be external environmental conditions. For example, the user may be willing to accept a lesser degree of comfort in a heat wave, or weight the ecology settings higher during a power brown-out. Device feedback may also be used to modify energy consumption characteristic weighting. For example, the cost savings characteristic may be modified by how efficiently the device under control is being operated. Likewise, the cost savings scale may be weighted by instantaneous or season changes in energy costs. All these modifications may change the weighting of energy characteristics of the energy space (e.g., the shape of the energy space). The UI display may represent a triangle where the relationship between vertices changes in response to modifications in the weighting of the energy space energy characteristics. Alternatively, the triangle remains the same, but the position of the compromise operating point changes with respect to the vertices. Contrasting FIGS. 4B and 4C, the shape of the triangle (and energy space) changes as a result of the user selecting a different comfort weighting than for the daytime.

In one aspect (FIG. 4B), the energy management application maintains a constant compromise operating point in response to modifications in the weighting of the energy space energy characteristics. The UI display represents a constant compromise operating point despite changes in the relationship between the triangle vertices. For example, if the cost of energy increases, the compromise operating point remains the same distance (a, b, and c) from the respective vertices. Alternatively, the compromise operating point may maintain a constant first energy space energy characteristic value despite modifications in the weighting of the energy space energy characteristics. For example, in FIG. 4C the compromise operating point remains a constant distance (a) from the comfort vertex.

Similarly, the UI display may present a sequence of menu-driven user prompts for defining components for each energy space energy characteristic, and the weighting of each defined component. For example, the user may define one aspect of comfort as being able to use a device on demand, and a low level of comfort as having to wait to run the device (e.g., waiting until power is cheaper). Likewise, once this aspect of comfort is defined, the user can assign a weight to the aspect. Typically, the defining of an energy consumption characteristic with a number of aspects increases the interdependency between characteristics.

In a typical configuration, the GUI provides three characteristics which are to be traded off against one another. Instead of providing the user with three controls to input the weights on each of the characteristics, the user is provided with a single graphical control to provide a natural, single input method that indicates the relative weight for each of the three characteristics. The weight for each characteristic is computed based on the relative distance of a marker placed by the user in the interior of a triangle. If the marker is place on a vertex, then that characteristic is assigned the maximum weight and the other vertices are assigned the minimum weight. If the marker is placed in the center of the triangle, then all the characteristics are given equal weight.

The GUI allows for all relative tradeoff weights to be specified when there are three characteristics to measure. This is true because of the relative weights, not the actual weight values assigned. Thus the weight (1,1,1) is the same to the control algorithms (i.e. the energy consumption application) as (2,2,2), (15,15,15), and (33.3, 33.3, 33.3). Any set of weight numbers inside the three-dimensional energy space defined by x, y, and z where each variable is in the range of (0, 100) and values are assigned by independent control inputs for x, y and z, can be mapped into the triangular plane defined by x+y+z=100.

It is known that the characteristics being traded off against one another may not be completely independent. For example, a preference of cost saving may also increase the merit of eco-conservation. It is often the case that a reduction in cost causes a reduction in energy use which reduces the amount of greenhouse gases required to produce the needed energy. When the user selects the relative trade-offs desired between the characteristics, the coupled effects between the characteristics are not evident in conventional systems. As the user selects various positions within the displayed 2-D triangle, the system computes the relative performance measures. These measures are then displayed by color and numerically, and the user can visualize the possible coupling between characteristics at each selected position within the polygon.

The system may also compute the performance measures for each of the characteristics over all input positions within the 2-D triangle. Each point in the triangle's interior may be colored by combining the intensity of the colors assigned to each characteristic. The intensity of each color is varied by the measure of compliance with the associated characteristic. For example, the corners of the triangle may be the full intensity of the assign color. The center of the triangle may be "white" if the algorithm computed that this position results in all three characteristics having the same level of "goodness".

An additional unique attribute is that the color gradient across the triangle may vary over time. This capability lets the user know that conditions have changed, so that a larger area of the triangle's interior favors one characteristic or another. For example, in the Spring and Fall seasons, more area of the triangle may have a hue related to cost savings or ecology because of the mild temperatures and strong solar input to photovoltaic (PV) panels. The user would not need to change their selection, but their present selection would indicate higher ecology and savings colors due to the season.

When a device is configured for operation within an automated control system, a set of operational limits are needed within which the system will operate. These limits can be configured with a set of defaults at the time of manufacture, but it is often desirable for the user to set the limits to his preference. However, the settings can be slightly complex as there may be subtle interactions among the various device parameters. Conventionally, a user may not customize the settings due to their reluctance to risk a configuration mistake or their lack of understanding of the settings required to meet their needs.

However, as described above, a simple two-dimensional triangle with configuration attributes labeled at its vertices may be used as an input method by the user to configure the device according to their preference. The three vertices could be labeled with operational characteristics such as; financial thrift, ecological conservation, and user comfort. The system may have a predefined setup for the device to match each of the operational characteristics. The user can see the setup of the device for each of the operational modes, thrift, ecology, and comfort. The user may modify the settings at each of these limits, but it is expected that most users will take the defaults as the three operational modes (energy consumption characteristics) are a better match for the way people configure devices over the single default configuration supplied by present day devices.

The user is not limited to the three modes of operation. During normal operation, the triangle control method described herein permits the user to compromise between the three modes depending on their present need. This is accomplished by placing a marker within the "control triangle".

In a networked control system, the default values for the three vertices can be downloaded from an Internet server. The values can then be adjusted for locale, societal groupings, etc., so that even more appropriate initial values can be supplied. For example, the ecology mode setting could be set to the average settings for those users who claim to be eco-minded.

Some advantages associated with the described GUI triangle are that the user is supplied with 3 predefined configurations for modes of operation instead of the single factory default of previous devices. The system can select default values based on locale or social groups. The user can better see which way to change settings to move a device to a more ecological, cost, or comfort setting. In combination with the triangle control, the user has a consistent object (the triangle with labeled vertices) with which to understand the operational modes of devices.

This system can be usefully extended to more vertices, but the mapping of more dimensions into the two-dimensional polygon may not allow for the relative weights to be independent, i.e. as the marker is moved within the polygon, not all relative tradeoffs are linear.

The following description is for an equilateral triangle, however, more vertices can be used but with the potential of a loss of the full range of trade-offs between all characteristics. When visualizing the operating condition of the device and configuring the operational tradeoffs, an equilateral triangle is presented on the GUI. Each vertex is labeled with a characteristic, say ecology, savings, and comfort. A marker is placed in the interior of the triangle and the position of this marker is controlled by the user (for example, by touch).

The system computes the preference of the user for each characteristic at the position of the marker by assigning a number (say from 0 to 1) based on the distance of the marker from the vertex relative to the distance from the vertex through the point to the opposite edge of the triangle. 0 is computed when the marker is located on the opposite side, 1 is computed when the marker is on the vertex, and 0.5 is computed when the marker is midpoint on any line drawn between the vertex and the opposite edge. The three preference values are then applied to the optimization algorithms. The algorithm then returns the expected cost, ecology compliance measure, and comfort measure computed with the applied values.

The expected cost could be a monetary number (with a deviation number if desired). Expected ecology compliance could be a measure of tons of $CO_2$, or greenhouse gas equivalent, or nuclear waste, or fish over the dam, etc. Expected comfort could be a measure of the degrees of air temperature different from the desired. This number could be biased by season, humidity, wind, etc. Because there may be an interdependence between characteristics, computed value from a characteristics may not be constant as the marker is moved along the opposite edge from its vertex. The algorithm may compensate for this fact by using the computed value at the opposite edge as the initial value when the marker is moved along the straight line from the opposite edge to the vertex, and increasing the value of the computed measure linearly as the marker moves to vertex.

The three measures returned by the algorithm may be compared to some norm so that a compliance value may be assigned. The three compliance values may then be used to set the intensity of the three colors assigned to the three characteristics. The three colors with their intensities thus set are added to provide a single color which represents the combined tradeoffs made at this marker location.

The norms used for each characteristic may be set by the factory. But a more useful setting for the norms may come from the norms of the geographical region or from a subscribed social group (e.g. athletic team, church group, school class, friends, etc.). The norms could also be based on historical performance measures. For example, costs incurred last week, or last month or the same season last year.

The three measures returned by the algorithm may be displayed near the triangle as an additional visualization for the user. The interior of the triangle may be colored by comparing each of the interior points to a norm, as described above. This results in a graduated coloring across the triangle with the strongest coloring at the vertices.

The user may select a time range over which the algorithm should optimize. For example the GUI may provide day, week, month, season, and year selections. The graduated color pattern may vary significantly between the time period selections. The graduated color pattern may change over time as the external input parameters to the algorithms change (e.g. weather forecast, energy mix cost, appliance usage pattern changes). This change provides useful feedback to the user such that the user may decide to make adjustments to their living patterns or changes to the position of the marker in the triangle.

When configuring the operating ranges of a device, a device configuration page may be displayed with an equilateral triangle having vertices labeled with characteristics (such as savings, ecology, and comfort). Any point within the triangle supplies a complete set of operating limits for the device. The set of operating limits at each of the vertices configure the device so it operates according to the characteristics of the label (savings minded, ecology minded, comfort minded). The configuration triangle itself may be selected by the user based on similar settings used by groups such as neighbors, social groups, local utility recommendations, or factory defaults. The user is queried to select the operating limits to be configured (ecology, saving, or comfort). The present settings are then displayed for the selected operating set, and the user is queried to place the marker within the triangle, to indicate the relative merit of the settings with respect to the vertices (ecology, savings, and comfort). The device limit settings computed for the marker position are loaded into the selected set, and the above-listed steps are repeated for the other two characteristics.

The operating limits for ecology, savings, and comfort are now set by the user. The process is simple, assuring valid configuration, and the user is able to compare their settings against the settings of others (their peers).

The energy consumption GUI may be used to improve electric efficiency by promoting the use of electricity when it's available instead of the normal process of using it when desired, and letting the providers worry about how to provide enough. Another less desirable way of avoiding mismatches in supply and demand is to use less when supply is low (without making up for it later). Electricity is typically priced in a way that minimizes surprises for residential users (flat rate), costs the least possible (regardless of environmental impact), and complies with legislative rules (pushing environmental interests).

The energy consumption GUI permits comfort to be defined for individual appliances in a way that makes the user most comfortable temperature-wise, gives the least inconvenience, minimizes the wait for using the appliance, and requires the least planning. Comfort can be stretched by some delta without interfering significantly with user well-being and sense of harmony. For example, a user may make the following adjustments:

FIG. 5 is a flowchart illustrating a method for controlling a multi-dimensional energy control system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

In Step 502 an energy management application, enabled as a sequence of software instructions stored in a memory and executed by a processor, organizes energy consumption by a device as an energy space with n energy characteristic axes, where n is an integer greater than 2. In Step 504 a display presents a graphical representation of the energy space as a two-dimensional polygon, where each polygon vertex is associated with a corresponding energy space energy characteristic. Step 506 accepts user commands for moving a displayed compromise operating point inside the displayed polygon. Step 508 calculates a compromise operating point in the energy space matching the displayed compromise operating point. Step 510 generates instructions for a device in response to calculating the energy space compromise operating point.

A system and method have been provided for a multi-dimensional energy control system and GUI. Examples of particular GUIs have been presented to illustrate the invention. However, the invention is not limited to merely these examples. Likewise, although a 3-dimensional energy space has been most commonly described in the interest of simplicity, the system and method are applicable to a larger number of energy spaces axes. Other variations and embodiments of the invention will occur to those skilled in the art.

We claim:

1. A method for controlling a multi-dimensional energy control system, the method comprising:
   an energy management application, enabled as a sequence of software instructions stored in a non-transitory memory and executed by a processor, organizing energy consumption by a device as an energy space with n energy characteristic axes, where n is an integer greater than 2;
   a display presenting a graphical representation of the energy space as a two-dimensional polygon, where each polygon vertex is associated with a corresponding energy characteristics of the energy space;
   accepting user commands for moving a displayed compromise operating point inside the displayed polygon;
   calculating a compromise operating point in the energy space matching the displayed compromise operating point; and
   generating instructions for a device in response to calculating the energy space compromise operating point.

2. A multi-dimensional energy control system comprising:
   a processor;
   a non-transitory memory; and
   an energy management application enabled as a sequence of software instructions stored in the non-transitory memory and executed by the processor;
   wherein the energy management application organizes the consumption of energy by a device as a n-dimensional energy space, where n is an integer greater than 2, and each axis in the energy space represents an energy consumption characteristic, and wherein the energy management application generates instructions for the device in response to calculating a compromise operating point in the energy space.

3. The system of claim 2 further comprising:
   a user interface (UI) connected to the energy management application having a display to receive a graphical representation of the energy space and compromise operating point, and an input to receive user commands for moving the represented compromise operating point in the represented energy space; and
   wherein the energy management application calculates the compromise operating point in the energy space to match the displayed compromise operating point.

4. The system of claim 3 wherein the UI display presents the energy space as a two-dimensional polygon with n vertices, where each vertex is associated with a corresponding energy consumption characteristic.

5. The system of claim 4 wherein the energy management application organizes the consumption of energy by the device as a three-dimensional energy space; and
   wherein the UI display represents the energy space as a triangle.

6. The system of claim 5 wherein the UI display presents each triangle vertex with an associated color.

7. The system of claim 6 wherein the compromise operating point is represented as a blend of the triangle vertices colors.

8. The system of claim 5 wherein the UI display presents a default triangle with initial condition settings for each vertex, the UI display further presenting a set of menu-driven prompts to accept user commands for modifying the initial condition settings;
   wherein the energy management application modifies weighting of energy characteristics of a default initial condition energy space, creating a sub-energy space inside the default initial condition energy space; and
   wherein the UI display, in response to sub-energy space, represents a user-customized triangle with each vertex located inside the default triangle.

9. The system of claim 5 wherein the energy management application organizes the consumption of energy for a plurality of devices in a corresponding plurality of three-dimensional energy spaces; and
   wherein the UI display represents each energy space with a corresponding triangle.

10. The system of claim 2 wherein the energy management application energy consumption characteristics are selected from a group consisting of user comfort, user economy, ecology, community need and device lifetime.

11. The system of claim 3 wherein the UI display represents the energy space as n selectively variable and interdependent indicators, where a change in a first indicator causes a change in a second indicator.

12. The system of claim 3 wherein the UI display represents the energy space as a two-dimensional polygon with n vertices, where each vertex is associated with a corresponding energy consumption characteristic, and is a selectively variable and interdependent indicator.

13. The system of claim 3 wherein the energy management application accepts inputs selected from a group consisting of time, time varying user preferences, external environmental conditions, device feedback and energy costs, and modifies weighting of energy characteristics of the energy space; and
    wherein the UI display represents a triangle where a relationship between vertices changes in response to modifications in the weighting of the energy characteristics of the energy space.

14. The system of claim 13 wherein the energy management application maintains a constant compromise operating point in response to modifications in the weighting of the energy characteristics of the energy space; and
    wherein the UI display represents a constant compromise operating point despite changes in the relationship between the triangle vertices.

15. The system of claim 13 wherein the energy management application maintains a constant first energy characteristic value of the energy space despite modifications in the weighting of the energy characteristics of the energy space.

16. The system of claim 3 wherein the UI display presents a sequence of menu-driven user prompts for defining components for each energy characteristics of the energy space, and weighting of each defined component.

17. The system of claim 3 wherein the UI display presents the energy space as a three-dimensional polygon with n vertices, where each vertex is associated with a corresponding energy consumption characteristic.

18. The system of claim 3 wherein the UI display presents a polygon in a perspective view with at least one representation of a curved line connecting two vertices.

\* \* \* \* \*